United States Patent
Karp et al.

(10) Patent No.: US 9,482,596 B2
(45) Date of Patent: Nov. 1, 2016

(54) OPTICAL MONITORING SYSTEM FOR A GAS TURBINE ENGINE

(71) Applicant: General Electric Company, Schenectady, NY (US)

(72) Inventors: Jason Harris Karp, Niskayuna, NY (US); Wontae Hwang, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 542 days.

(21) Appl. No.: 13/925,403

(22) Filed: Jun. 24, 2013

(65) Prior Publication Data

US 2014/0376589 A1    Dec. 25, 2014

(51) Int. Cl.

| | |
|---|---|
| *G02B 6/00* | (2006.01) |
| *G01J 1/04* | (2006.01) |
| *G01J 5/48* | (2006.01) |
| *G01M 15/14* | (2006.01) |

(52) U.S. Cl.
CPC ......... *G01M 15/14* (2013.01); *Y10T 29/49826* (2015.01)

(58) Field of Classification Search
CPC .............. G01J 1/02; G01J 5/00; G01J 5/08; G01J 1/04; G01J 1/16; G01J 5/48; G02B 6/00
USPC ....... 374/120, 121, 130–132, 161, 141, 152, 374/153; 356/43; 385/15, 27, 39, 76, 83
See application file for complete search history.

(56) References Cited

U.S. PATENT DOCUMENTS

| | | | | |
|---|---|---|---|---|
| 1,506,487 | A | * | 8/1924 | William ............... H01R 33/973 439/303 |
| 4,750,139 | A | * | 6/1988 | Dils .......................... G01J 5/08 250/227.23 |
| 5,311,604 | A | * | 5/1994 | Rogner ................... B29C 67/00 264/1.25 |

(Continued)

FOREIGN PATENT DOCUMENTS

| | | | | |
|---|---|---|---|---|
| EP | 0425229 | | 5/1991 | |
| FR | 1176441 A2 | * | 1/2002 | ........... G02B 6/3839 |
| JP | 2006208426 A | * | 8/2006 | |

OTHER PUBLICATIONS

Harrington, "Infrared Fiber Optics", OSA Handbook, vol. III, McGraw Hill.

(Continued)

*Primary Examiner* — Gail Kaplan Verbitsky
(74) *Attorney, Agent, or Firm* — Pabitra K. Chakrabarti (57) ABSTRACT

A system for optically monitoring a gas turbine engine includes a viewport into the gas turbine engine, and an optical connection having a first axial end and a second axial end. The first axial end is optically coupled to the viewport and configured to receive an image from the viewport, the optical connection includes a substrate having multiple hollow passages each extending from the first axial end to the second axial end, and each hollow passage includes a reflective coating disposed on an inner surface of the hollow passage to facilitate transmission of a respective portion of the image from the first axial end to the second axial end. In addition, the system includes a detector array in optical communication with the second axial end of the optical connection. The detector array includes multiple detection elements configured to receive multiple respective portions of the image from the hollow passages.

20 Claims, 6 Drawing Sheets

(56) References Cited

U.S. PATENT DOCUMENTS

| | | | |
|---|---|---|---|
| 5,366,290 A | 11/1994 | Mayer et al. | |
| 5,507,576 A * | 4/1996 | Fally | G01J 5/60 356/45 |
| 5,567,471 A | 10/1996 | Harrington et al. | |
| 5,729,646 A | 3/1998 | Miyagi et al. | |
| 5,853,626 A * | 12/1998 | Kato | G02B 6/4214 216/24 |
| 6,109,783 A * | 8/2000 | Dobler | G01J 5/0022 374/131 |
| 6,157,755 A * | 12/2000 | Brauch | G02B 6/4249 372/43.01 |
| 6,175,678 B1 | 1/2001 | Sanghera et al. | |
| 6,364,524 B1 | 4/2002 | Markham | |
| 6,538,238 B1 * | 3/2003 | Berkcan | H05B 3/746 219/446.1 |
| 6,698,920 B1 * | 3/2004 | Maylotte | G01J 5/0022 356/73 |
| 7,503,706 B2 * | 3/2009 | Wipiejewski | G02B 6/4292 385/14 |
| 8,075,181 B1 * | 12/2011 | Stauffer | A61B 5/015 374/121 |
| 8,253,945 B2 | 8/2012 | Gahan et al. | |
| 2002/0064205 A1 * | 5/2002 | Tubbs | G01J 5/0014 374/131 |
| 2002/0071627 A1 * | 6/2002 | Smith | G02B 6/266 385/15 |
| 2002/0110328 A1 * | 8/2002 | Bischel | G02B 6/4201 385/49 |
| 2003/0142932 A1 * | 7/2003 | Reyes-Gavilan | C08K 5/13 385/100 |
| 2004/0007668 A1 * | 1/2004 | Barlian | G01J 5/08 250/353 |
| 2004/0179575 A1 | 9/2004 | Markham | |
| 2005/0205766 A1 * | 9/2005 | Sawada | G01J 1/04 250/227.11 |
| 2006/0059917 A1 * | 3/2006 | Plimpton | F01D 17/08 60/772 |
| 2006/0251368 A1 * | 11/2006 | Kittaka | B82Y 20/00 385/125 |
| 2008/0245980 A1 | 10/2008 | Diatzikis | |
| 2008/0282742 A1 * | 11/2008 | Colgan | G02B 6/3636 65/406 |
| 2008/0310804 A1 * | 12/2008 | Brummel | F01D 21/003 385/115 |
| 2009/0141349 A1 * | 6/2009 | Myhre | F01D 17/02 359/507 |
| 2011/0043612 A1 * | 2/2011 | Keller | A61B 1/00165 348/49 |
| 2011/0199606 A1 * | 8/2011 | Jung | A61B 5/0088 356/73 |
| 2012/0099820 A1 * | 4/2012 | Rolston | G02B 6/4249 385/59 |
| 2012/0176600 A1 | 7/2012 | Falk et al. | |
| 2013/0215425 A9 * | 8/2013 | Duer | G02B 6/4226 356/432 |
| 2014/0376588 A1 * | 12/2014 | Wang | G01J 5/0088 374/121 |

OTHER PUBLICATIONS

Johnson, "Hollow Glass Waveguides with Multilayer Polystyrene and Metal Sulfide Thin Film Coatings for Improved Infrared Transmission," Rurgers University, Oct. 2007, New Brunswick, NJ.
IRflex Research Projects Jun. 18, 2013.

* cited by examiner

OPTICAL MONITORING SYSTEM FOR A GAS TURBINE ENGINE

BACKGROUND

The subject matter disclosed herein relates to an optical monitoring system for a gas turbine engine.

Certain gas turbine engines include a turbine and/or a combustor having viewports configured to facilitate monitoring of various components within the turbine and/or the combustor. For example, a pyrometry system may receive radiation signals through the viewports to measure a temperature of certain components within a hot gas path of the gas turbine engine. The pyrometry system may include multiple sensors, each optically coupled to a corresponding viewport and configured to measure the intensity of radiation emitted by the turbine components and/or the combustor components. For example, certain sensors (e.g., optical sensors) are configured to provide a line-of-sight point temperature measurement or an average temperature measurement of each monitored component.

Utilizing an infrared camera having a two-dimensional detector array may provide additional information regarding the performance of each monitored component, such as thermal stress within the component. However, it may be undesirable to position an infrared camera proximate to a viewport due to the heat and vibration generated by the gas turbine engine. For example, if the infrared camera is positioned proximate to the viewport, a cooling system may be employed to maintain the temperature of the infrared camera within a desirable range. Unfortunately, utilizing a cooling system may substantially increase the cost and complexity associated within monitoring the gas turbine engine. Furthermore, employing a fiber optic cable to convey an image from the viewport to a remote infrared camera may be undesirable due to substantial losses associated with typical fiber optic cables. For example, the fiber optic cable may be formed from a material that absorbs radiation within a detectable wavelength range of the infrared camera. Accordingly, electromagnetic radiation emitted by components within the turbine and/or within the combustor may not reach the detector array with sufficient intensity and negligible interference to be detected.

BRIEF DESCRIPTION

In one embodiment, a system for optically monitoring a gas turbine engine includes a viewport into an element of the gas turbine engine, in which the viewport is configured to receive an image from an interior of the element. The system also includes an optical connection having a first axial end and a second axial end. The first axial end is optically coupled to the viewport and configured to receive the image from the viewport, the optical connection includes a substrate having multiple hollow passages each extending from the first axial end to the second axial end, and each hollow passage includes a reflective coating disposed on an inner surface of the hollow passage to facilitate transmission of a respective portion of the image from the first axial end to the second axial end. In addition, the system includes a detector array in optical communication with the second axial end of the optical connection. The detector array includes multiple detection elements, the detection elements are configured to receive multiple respective portions of the image from the hollow passages, and the detector array is configured to output signals indicative of a two-dimensional intensity map of the image.

In another embodiment, a system for optically monitoring a gas turbine engine includes a viewport having an opening disposed within a casing of the gas turbine engine. The opening extends from an interior side of the casing to an exterior side of the casing, and the viewport is configured to receive an image from inside the casing while the gas turbine engine is in operation. The system also includes an optical connection positioned outside the casing and having a first axial end and a second axial end. The first axial end is optically coupled to the viewport and configured to receive the image from the viewport, the optical connection includes a substrate having multiple hollow passages each extending from the first axial end to the second axial end, and each hollow passage includes a reflective coating disposed on an inner surface of the hollow passage to facilitate transmission of a respective portion of the image from the first axial end to the second axial end. In addition, the system includes a detector array in optical communication with the second axial end of the optical connection. The detector array includes multiple detection elements, the detection elements are configured to receive multiple respective portions of the image from the hollow passages, and the detector array is configured to output signals indicative of a two-dimensional intensity map of the image.

In a further embodiment, a method of manufacturing an optical monitoring system for a gas turbine engine includes optically coupling a first axial end of an optical connection to a viewport into an element of the gas turbine engine. The viewport is configured to receive an image from an interior of the element, the optical connection is configured to receive the image from the viewport, the optical connection includes a substrate having multiple hollow passages each extending from the first axial end to a second axial end of the optical connection, and each hollow passage includes a reflective coating disposed on an inner surface of the hollow passage to facilitate transmission of a respective portion of the image from the first axial end to the second axial end. The method also includes optically coupling the second axial end of the optical connection to a detector array having multiple detection elements. The detection elements are configured to receive multiple respective portions of the image from the hollow passages, and the detector array is configured to output signals indicative of a two-dimensional intensity map of the image.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

Embodiments disclosed herein may enhance gas turbine engine operation and maintenance by providing a two-dimensional temperature map of an interior surface of the gas turbine engine while the gas turbine engine is in operation. In certain embodiments, an optical monitoring system includes a viewport into an element (e.g., combustor, turbine, etc.) of the gas turbine engine, and the viewport is configured to receive an image from an interior of the element. The optical monitoring system also includes an optical connection having a first axial end and a second axial end. The first axial end is optically coupled to the viewport and configured to receive the image from the viewport. The optical connection includes a substrate having multiple hollow passages each extending from the first axial end to the second axial end, and each hollow passage includes a reflective coating disposed on an inner surface of the hollow passage to facilitate transmission of a respective portion of the image from the first axial end to the second axial end. In addition, the optical monitoring system includes a detector array in optical communication with the second axial end of the optical connection. The detector array includes multiple detection elements, the detection elements are configured to receive multiple respective portions of the image from the hollow passages, and detector array is configured to output signals indicative of a two-dimensional intensity map of the image. Because electromagnetic radiation associated with each portion of the image passes through a respective hollow passage, losses due to absorption through the optical connection may be substantially reduced. Accordingly, the detector array may receive sufficient radiant energy to detect the two-dimensional intensity map, thereby facilitating generation of a two-dimensional temperature map of a monitored surface within the gas turbine engine.

Figure 1:
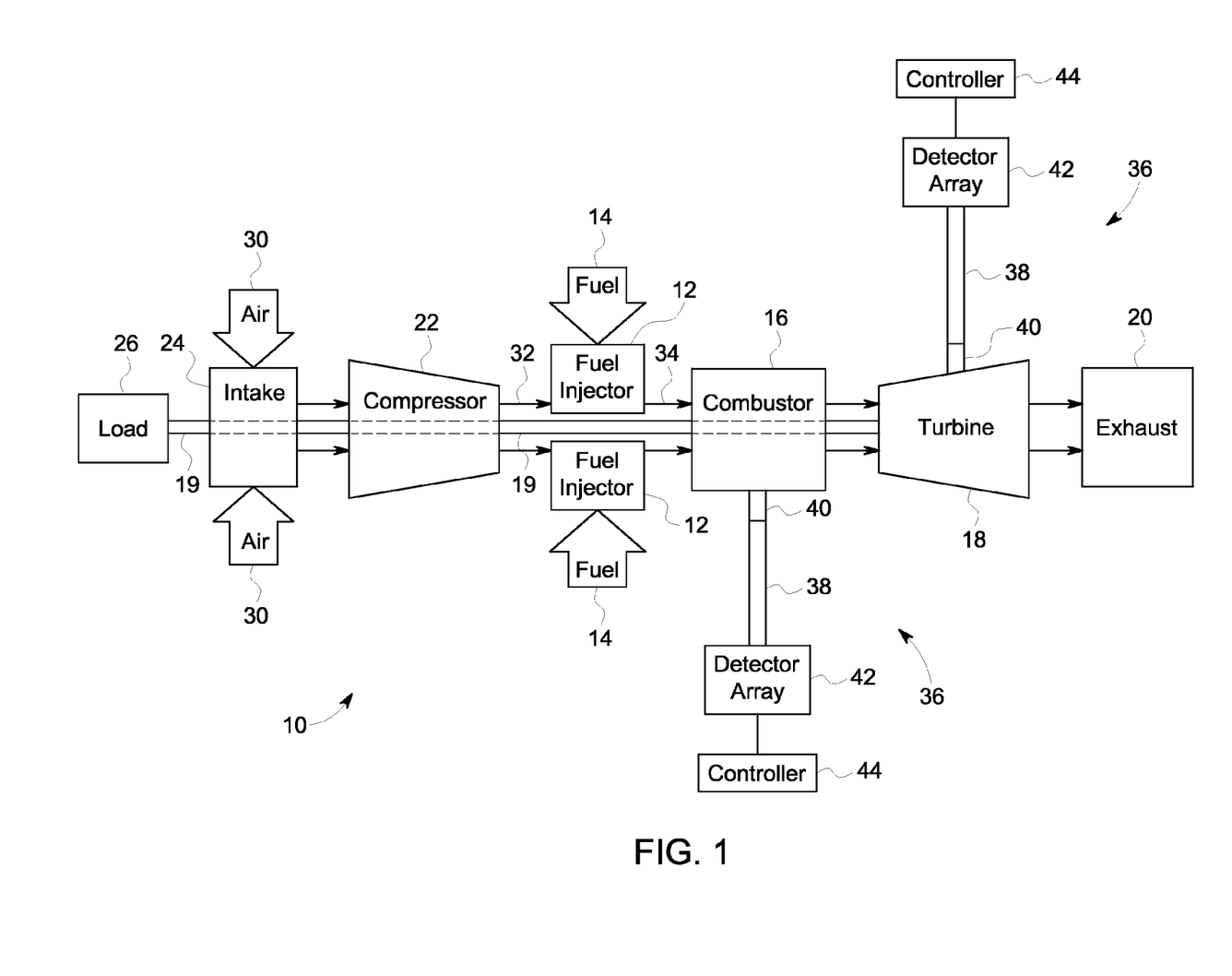
FIG. 1 is a block diagram of an embodiment of a gas turbine system, including an optical monitoring system having an optical connection configured to convey an image from a viewport to a detector array.

Turning now to the drawings, FIG. 1 is a block diagram of an embodiment of a turbine system 10, including an optical monitoring system having an optical connection configured to convey an image from a viewport to a detector array. The turbine system 10 includes a fuel injector 12, a fuel supply 14, and a combustor 16. As illustrated, the fuel supply 14 routes a liquid fuel and/or gas fuel, such as natural gas, to the gas turbine system 10 through the fuel injector 12 into the combustor 16. As discussed below, the fuel injector 12 is configured to inject and mix the fuel with compressed air. The combustor 16 ignites and combusts the fuel-air mixture, and then passes hot pressurized exhaust gas into a turbine 18. As will be appreciated, the turbine 18 includes one or more stators having fixed vanes or blades, and one or more rotors having blades that rotate relative to the stators. The exhaust gas passes through the turbine rotor blades, thereby driving the turbine rotor to rotate. Coupling between the turbine rotor and a shaft 19 induces rotation of the shaft 19, which is also coupled to several components throughout the gas turbine system 10, as illustrated. Eventually, the exhaust of the combustion process exits the gas turbine system 10 via an exhaust outlet 20.

A compressor 22 includes blades rigidly mounted to a rotor, which is driven to rotate by the shaft 19. As air passes through the rotating blades, air pressure increases, thereby providing the combustor 16 with sufficient air for proper combustion. The compressor 22 intakes air to the gas turbine system 10 via an air intake 24. Further, the shaft 19 may be coupled to a load 26, which is powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane, and so forth. The air intake 24 draws air 30 into the gas turbine system 10 via a suitable mechanism, such as a cold air intake. The air 30 then flows through blades of the compressor 22, which provides compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

As illustrated, the turbine system 10 includes an optical monitoring system 36 optically coupled to the turbine 18. In the illustrated embodiment, the optical monitoring system 36 includes an optical connection 38 extending between a viewport 40 into the turbine 18 and a detector array 42. As discussed in detail below, the optical connection 38 includes a substrate having multiple hollow passages each having a reflective coating disposed on an inner surface of the hollow passage. Each reflectively coated hollow passage facilitates transmission of a respective portion of an image from the viewport 40 to the detector array 42. Because electromagnetic radiation associated with each portion of the image passes through a respective hollow passage, losses due to absorption through the optical connection may be substantially reduced. Accordingly, the detector array 42 may receive sufficient radiant energy to detect a two-dimensional intensity map of the image. The detector array 42, in turn, is configured to output signals indicative of the two-dimensional intensity map. In the illustrated embodiment, the detector array 42 is communicatively coupled to a controller 44, which is configured to receive the signals and to compute a two-dimensional temperature map of each monitored turbine component based on the signals. Because the optical monitoring system 36 generates a two-dimensional temperature map, a temperature gradient across each monitored turbine component may be measured, thereby providing additional information related to component stress, as compared to configurations that only measure a line-of-sight point temperature or an average temperature of each component.

In certain embodiments, the controller 44 is an electronic controller having electrical circuitry configured to process data from the detector array 42. For example, the controller 44 may include processors, storage devices, and memory devices. The processor(s) may be used to execute software, such as image processing software, and so forth. Moreover, the processor(s) may include one or more microprocessors, such as one or more "general-purpose" microprocessors, one or more special-purpose microprocessors, and/or application specific integrated circuits (ASICS), or some combination thereof. For example, the processor(s) may include one or more reduced instruction set (RISC) processors.

The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., image data, etc.), instructions (e.g., software or firmware for processing images, etc.), and any other suitable data. The memory device(s) may include a volatile memory, such as random access memory (RAM), and/or a nonvolatile memory, such as ROM. The memory device(s) may store a variety of information and may be used for various purposes. For example, the memory device(s) may store processor-executable instructions (e.g., firmware or software) for the processor(s) to execute, such as instructions for an image processing software.

In certain embodiments, the controller 44 may include a communication device (e.g., network interface, wireless communication module, etc.) configured to communicate (e.g., via wired or wireless signals) with a remote server or a cloud-based computer network, for example. In such embodiments, the controller 44 may output signals indicative of the two-dimensional temperature map of each monitored turbine component. The remote server or network may store and/or process the signals to facilitate short-term and/or long-term health monitoring of the turbine components. For example, the remote server or network may compare a first two-dimensional temperature map of a component with a previous two-dimensional temperature map of the component to identify variations in the temperature and/or the temperature gradient.

In the illustrated embodiment, the gas turbine system 10 includes a second optical monitoring system 36 optically coupled to the combustor 16. Similar to the turbine optical monitoring system described above, the combustor optical monitoring system includes an optical connection 38 extending between a viewport 40 into the combustor 16 and a detector array 42. In addition, the optical connection 38 includes a substrate having multiple hollow passages each having a reflective coating disposed on an inner surface of the hollow passage. Each reflectively coated hollow passage facilitates transmission of a respective portion of an image from the viewport 40 to the detector array 42. While the illustrated embodiment employs separate optical monitoring systems 36 to monitor the combustor 16 and the turbine 18, it should be appreciated that, in alternative embodiments, a single optical monitoring system having multiple detector arrays may be employed to monitor the combustor 16 and the turbine 18. In such embodiments, one or more optical connections may extend from the turbine 18 and the combustor 16 to respective detector arrays. In further embodiments, one or more optical monitoring systems may be employed to monitor the compressor 22, the intake 24, the fuel injectors 12, and/or the exhaust 20.

Figure 2:
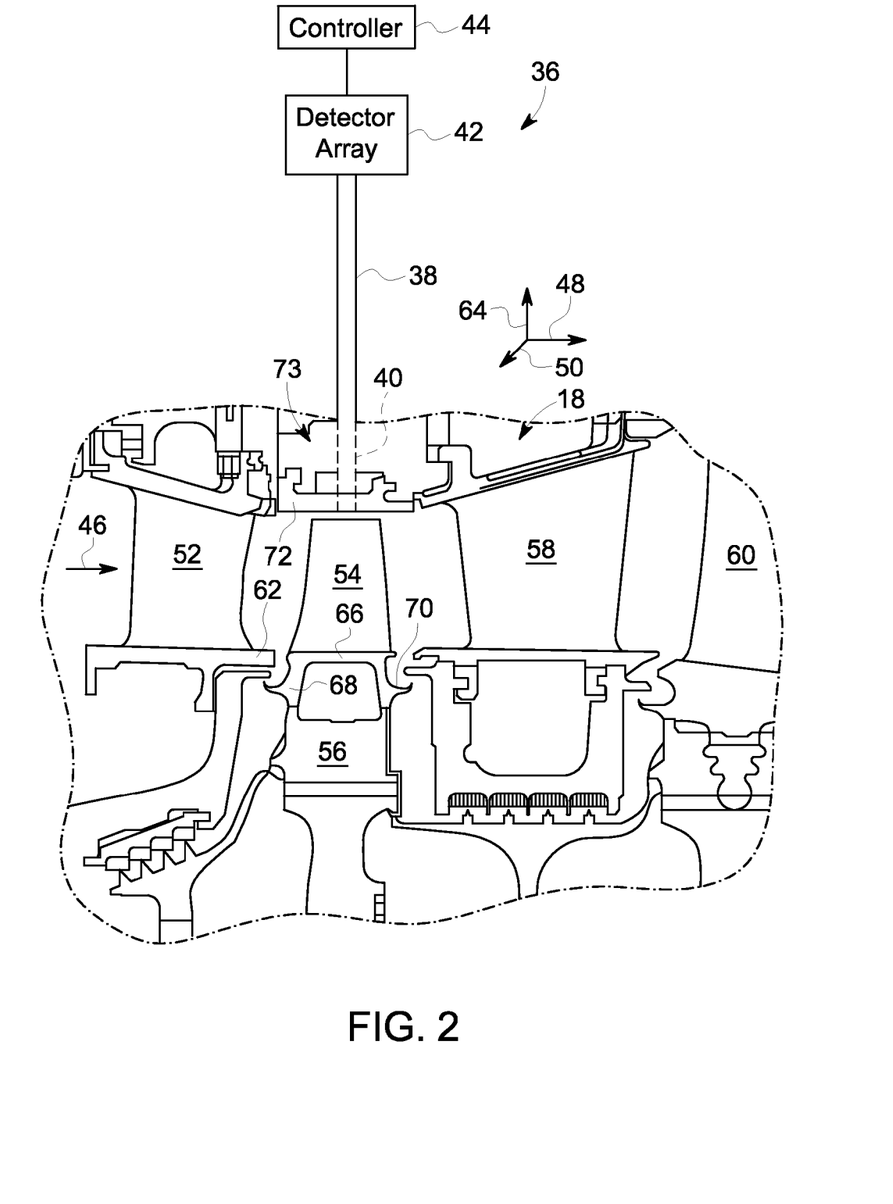
FIG. 2 is a cross-sectional view of an embodiment of a turbine section, including various turbine components that may be monitored by an optical monitoring system.

FIG. 2 is a cross-sectional view of a turbine section, including various turbine components that may be monitored by the optical monitoring system 36. As illustrated, exhaust gas 46 from the combustor 16 flows into the turbine 18 in an axial direction 48 and/or a circumferential direction 50. The illustrated turbine 18 includes at least two stages, with the first two stages shown in FIG. 2. Other turbine configurations may include more or fewer turbine stages. For example, a turbine may include 1, 2, 3, 4, 5, 6, or more turbine stages. The first turbine stage includes vanes 52 and blades 54 substantially equally spaced in the circumferential direction 50 about the turbine 18. The first stage vanes 52 are rigidly mounted to the turbine 18 and configured to direct combustion gas toward the blades 54. The first stage blades 54 are mounted to a rotor 56 that is driven to rotate by the exhaust gas 46 flowing through the blades 54. The rotor 56, in turn, is coupled to the shaft 19, which drives the compressor 22 and the load 26. The exhaust gas 46 then flows through second stage vanes 58 and second stage blades 60. The second stage blades 60 are also coupled to the rotor 56. As the exhaust gas 46 flows through each stage, energy from the gas is converted into rotational energy of the rotor 56. After passing through each turbine stage, the exhaust gas 46 exits the turbine 18 in the axial direction 48.

In the illustrated embodiment, each first stage vane 52 extends outwardly from an endwall 62 in a radial direction 64. The endwall 62 is configured to block hot exhaust gas 46 from entering the rotor 56. A similar endwall may be present adjacent to the second stage vanes 58, and subsequent downstream vanes, if present. Similarly, each first stage blade 54 extends outwardly from a platform 66 in the radial direction 64. As will be appreciated, the platform 66 is part of a shank 68 which couples the blade 54 to the rotor 56. The shank 68 also includes a seal, or angel wing, 70 configured to block hot exhaust gas 46 from entering the rotor 56. Similar platforms and angel wings may be present adjacent to the second stage blades 60, and subsequent downstream blades, if present. Furthermore, a shroud 72 is positioned radially outward from the first stage blades 54. The shroud 72 is configured to reduce the quantity of exhaust gas 46 that bypasses the blades 54. Gas bypass is undesirable because energy from the bypassing gas is not captured by the blades 54 and translated into rotational energy. While the optical monitoring system 36 is described below with reference to monitoring components within the turbine 18 of a gas turbine engine 10, it should be appreciated that the optical monitoring system 36 may be employed to monitor components within other rotating and/or reciprocating machinery, such as a turbine in which steam or another working fluid passes through turbine blades to provide power or thrust.

As will be appreciated, various components within the turbine 18 (e.g., vanes 52 and 58, blades 54 and 60, endwalls 62, platforms 66, angel wings 70, shrouds 72, etc.) are exposed to the hot exhaust gas 46 from the combustor 16. Consequently, it may be desirable to measure a temperature of certain components during operation of the turbine 18 to ensure that the temperature remains within a desired range and/or to monitor thermal stress within the components. For example, the optical monitoring system 36 may be configured to determine a two-dimensional temperature map of the first stage turbine blades 54. As will be appreciated, the two-dimensional temperature map may be utilized to determine a temperature gradient across each blade 54, thereby facilitating computation of thermal stress within the blade 54.

In the illustrated embodiment, an optical connection 38 optically couples a viewport 40 to the detector array 42. As illustrated, the optical connection 38 is configured to convey an image of a circumferential side of the blade 54 to the detector array 42. The viewport 40 may be angled in the axial direction 48, circumferential direction 50, and/or radial direction 64 to direct the viewport 40 toward a desired region of the blade 54. In addition, the viewport 40 may be positioned upstream of the blade 54 to facilitate monitoring an upstream portion of the blade 54, or downstream from the blade 54 to facilitate monitoring a downstream portion of the blade 54. In alternative embodiments, additional viewports 40 and optical connections 38 may be employed to obtain additional images of the first stage blade 54. For example, certain embodiments may employ 1, 2, 3, 4, 5, 6, 7, 8, or more viewports 40 and a corresponding number of optical connections 38 to convey images of the blade 54 to respective detector arrays. As will be appreciated, the more viewports 40 and optical connections 38 employed, the more regions of the blade 54 that may be monitored.

As discussed in detail below, the optical connection 38 includes a substrate having multiple hollow passages each extending along a length of the optical connection 38. Each hollow passage includes a reflective coating disposed on an inner surface of the hollow passage to facilitate transmission of a respective portion of an image from the viewport 40 to the detector array 42. In certain embodiments, the detector array includes multiple detection elements each substantially aligned with at least one respective hollow passage of the optical connection 38. Each detection element is configured to receive at least one respective portion of the image from the at least one respective hollow passage, thereby enabling the detector array 42 to output signals indicative of a two-dimensional intensity map of the image. The optical connection 38 may be substantially straight, as illustrated, or the optical connection 38 may include a bend that establishes clearance between the optical connection 38 and another component positioned outside the turbine.

While the viewport 40 is directed toward the first stage blades 54 in the illustrated embodiment, it should be appreciated that the viewport 40 may be directed toward other turbine components in alternative embodiments. For example, one or more viewports 40 may be directed toward the first stage vanes 52, the second stage vanes 58, the second stage blades 60, the endwalls 62, the platforms 66, the angel wings 70, the shrouds 72, or other components within the turbine 18. Further embodiments may include viewports 40 directed toward multiple components within the turbine 18. Similar to the first stage blades 54, the optical monitoring system 36 may determine a two-dimensional temperature map for each component within a field of view of a viewport 40. In this manner, thermal stress within various turbine components may be measured, thereby providing an operator with data that may be used to adjust operational parameters of the turbine system 10 and/or to determine maintenance intervals.

As previously discussed, the detector array 42 is configured to receive an image from the optical connection 38 and to output signals indicative of an intensity map of radiant energy within a desired wavelength range. The detector array 42 may be configured to capture multiple images over a period of time. As will be appreciated, certain turbine components, such as the first stage blades 54 described above, may rotate at high speed along the circumferential direction 50 of the turbine 18. Consequently, to capture an image of such components, the detector array 42 may be configured to operate at a frequency sufficient to provide the controller 44 with a substantially still image of each component. For example, in certain embodiments, the detector array 42 may be configured to output the signals indicative of the intensity map of each image at a frequency greater than approximately 100, 1000, 10,000, 20,000, 40,000, 60,000, 80,000, or 100,000 Hz, or more. In further embodiments, the detector array 42 may be configured to output the signals indicative of the intensity map of each image with an integration time shorter than approximately 25, 20, 15, 10, 5, 3, 2, 1, or 0.5 microseconds, or less. In this manner, a two-dimensional temperature map may be generated for each rotating turbine component.

Figure 3:
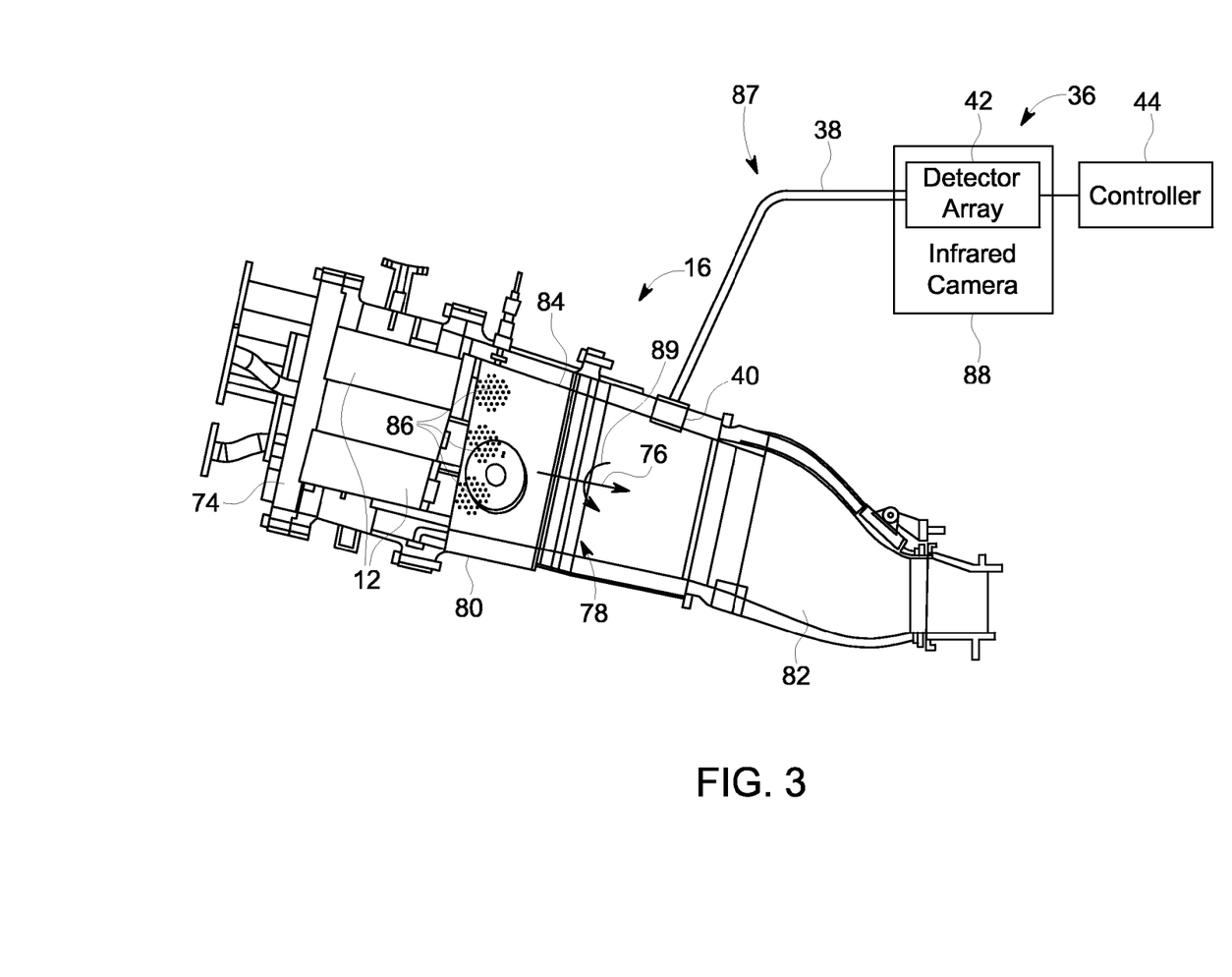
FIG. 3 is a cross-sectional view of an embodiment of a combustor, including various combustor components that may be monitored by an optical monitoring system.

FIG. 3 is a cross-sectional view of an embodiment of a combustor 16, including various combustor components that may be monitored by the optical monitoring system 36. As illustrated, the combustor 16 includes fuel nozzles 12 that are attached to an end cover 74 at a base of the combustor 16. In certain embodiments, the combustor 16 may include five or six fuel nozzles 12. In other embodiments of combustor 16 may include a single large fuel nozzle 12. The surfaces and geometry of the fuel nozzles 12 are particularly configured to enhance mixing of the air and fuel as the fuel-air mixture flows downstream through the combustor 16. The enhanced mixing may increase combustor efficiency, thereby producing more power in the turbine engine. The fuel-air mixture is expelled from the fuel nozzles 12 in a downstream direction 76 to a combustion zone 78 inside a combustor casing 80. The combustion zone 78 is positioned downstream from the fuel nozzles 12 to reduce heat transfer from the hot combustion gas to the fuel nozzles 12. In the illustrated embodiment, the combustion zone 78 is located inside the combustor casing 80, downstream from the fuel nozzles 12 and upstream from a transition piece 82 of the combustor 16. The transition piece 82 directs the pressurized exhaust gas toward the turbine 18, and includes a converging section configured to increase a velocity of the exhaust gas, thereby producing a greater force to drive the turbine 18 in rotation. In the illustrated embodiment, the combustor 16 includes a liner 84 located inside the casing 80 to provide a hollow annular path for a cooling air flow, which cools the casing 80 around the combustion zone 78. The liner 84 may establish a suitable shape to improve flow from the fuel nozzles 12 to the turbine 18.

In the illustrated embodiment, the optical monitoring system 36 includes an optical connection 38 to a viewport 40 into the combustor 16. As discussed in detail below, the viewport 40 includes an opening disposed within the casing 80 and extending from an interior side of the casing to an exterior side of the casing. In addition, the viewport 40 is directed toward a region of interest within the combustor 16. For example, in the illustrated embodiment, the viewport 40 is directed toward the liner 84 on an opposite side of the combustor 16 from flames 86 and exhaust gas. As discussed in detail below, the optical monitoring system 36 may include additional viewports 40 to facilitate monitoring of other interior surfaces and/or components of the combustor, such as an interior surface of the transition piece 82.

In the illustrated embodiment, the optical monitoring system 36 includes an optical connection 38 positioned outside the casing 80 and optically coupled to the viewport 40. The optical connection is configured to convey an image of an interior of the combustor 16 to the detector array 42. As discussed in detail below, the optical connection 38 includes a substrate having multiple hollow passages each having a reflective coating disposed on an inner surface of the hollow passage. Each reflectively coated hollow passage facilitates transmission of a respective portion of the image from the viewport 40 to the detector array 42. Because electromagnetic radiation associated with each portion of the image passes through a respective hollow passage, losses due to absorption through the optical connection may be substantially reduced. Accordingly, the detector array may receive sufficient radiant energy to detect a two-dimensional intensity map of the image, thereby facilitating generation of a two-dimensional temperature map of a monitored surface within the combustor 16.

In certain embodiments, the substrate is formed from a substantially rigid material. Accordingly, the bending stiffness and/or the flexural rigidity of the optical connection 38 may be significantly higher than a flexible optical cable. As a result, the optical connection 38 may substantially maintain an original shape during operation of the gas turbine engine. In alternative embodiments, the substrate may be formed from a substantially flexible material, thereby enabling the optical connection 38 to be bent into a desired shape before installation and/or duration operation of the gas turbine engine.

In the illustrated embodiment, the optical connection includes a substantially rigid substrate having a preformed bend 87. The preformed bend 87 may be formed by heating the substrate and bending the substrate to a desired angle. For example, heat may be applied to a desired region of the substrate, thereby enabling the substantially rigid substrate to bend in response to application of force (e.g., a bending load). As the substrate cools, a substantially rigid substrate having a desired bend is formed. As will be appreciated, additional bends (e.g., 1, 2, 3, 4, 5, 6, 7, 8, or more) may be formed by repeating the bending process. The shape of the optical connection may be particularly selected to maintain clearance between the optical connection and certain components positioned outside the combustor 16. For example, an angle of the bend 87 is particularly selected to maintain a desired clearance between a component positioned outside the casing 80 and the optical connection 38.

In the illustrated embodiment, the optical monitoring system 36 includes an infrared camera 88 having the detector array 42. The detector array 42 of the turbine optical monitoring system may also be an element of an infrared camera. In certain embodiments, the detector array 42 is configured to detect short-wave infrared images (e.g., having a wavelength range of about 0.9 to about 1.7 microns) and/or mid-wave infrared images (e.g., having a wavelength range of about 3 to about 5 microns). For example, a detector array configured to detect short-wave infrared images may be employed to monitor components within the turbine 18, and a detector array configured to detect mid-wave infrared images may be employed to monitor components within the combustor 16. The detector array 42 is configured to output signals indicative of a two-dimensional intensity map of the detected image to the controller 44. The controller 44, in turn, is configured to generate a two-dimensional temperature map of an interior surface of the combustor based on the signals. Because the optical monitoring system 36 generates a two-dimensional temperature map, a temperature gradient across the monitored surface of the combustor may be measured, as compared to pyrometry systems that only measure a line-of-sight point temperature or an average temperature of the interior combustor surface. Analyzing the temperature gradient of the combustor surface may provide additional information related to surface stress, thereby facilitating determination of a maintenance interval.

While the illustrated embodiment includes a single viewport 40 into the combustor 16, it should be appreciated that alternative embodiments may include additional viewports. For example, in certain embodiments, the combustor 16 may include 2, 4, 6, 8, 10, 12, or more viewports 40. The viewports 40 may be distributed along the length of the combustor 16 in the direction 76 and/or about the circumference of the combustor 16 in the direction 89. Each viewport 40 may be directed toward a region of interest within the combustor 16. For example, viewports 40 located proximate to the fuel nozzles 12 may be directed toward surfaces (e.g., the liner 84, etc.) within the combustion zone 78 proximate to the flames 86, and the viewports 40 located farther downstream may be directed toward the combustor liner 84 and/or the transition piece 82. In this manner, various regions of the combustor 16 may be monitored by the optical monitoring system 36. In addition, by positioning viewports 40 circumferentially around the combustor 16 in the direction 89, the optical monitoring system 36 may monitor different portions of the combustor liner 84 and/or the transition piece 82. Furthermore, while the optical monitoring system 36 is configured to monitor a single combustor in the illustrated embodiment, it should be appreciated that, in alternative embodiments, the optical monitoring system 36 may be configured to monitor multiple combustors.

Figure 4:
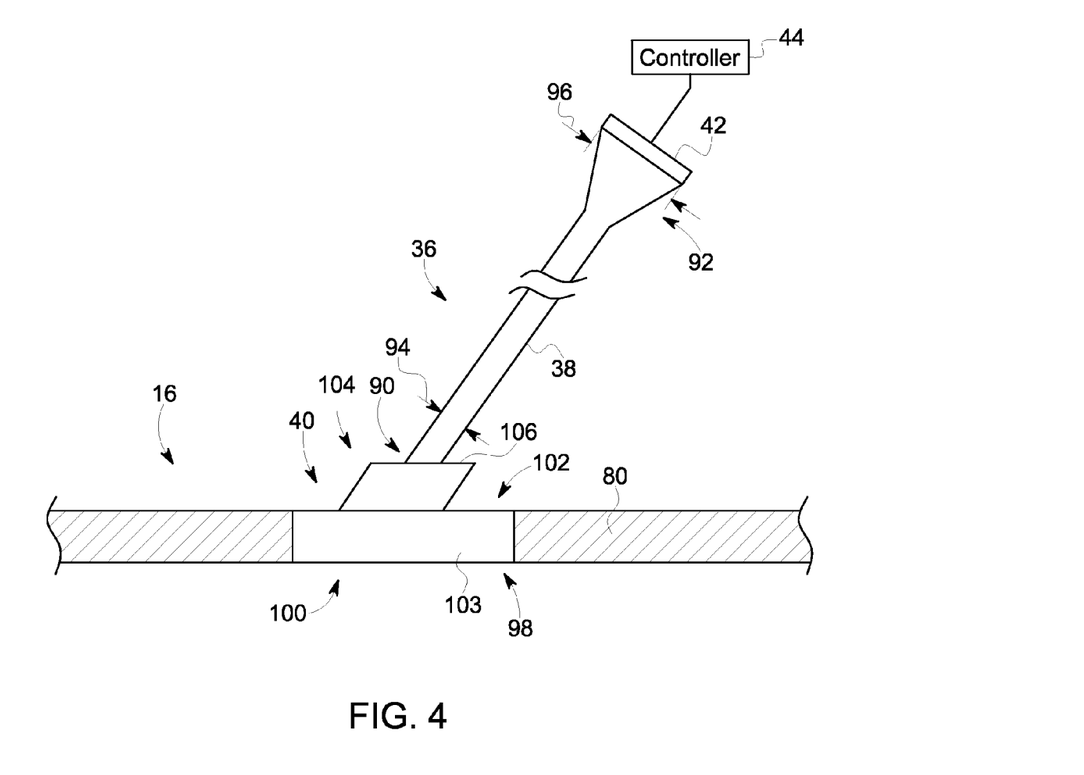
FIG. 4 is a schematic view of an embodiment of an optical monitoring system having an optical connection configured to convey an image from a viewport to a detector array.

FIG. 4 is a schematic view of an embodiment of an optical monitoring system 36 having an optical connection 38 configured to convey an image from a viewport 40 to a detector array 42. In the illustrated embodiment, the optical connection 38 includes a first axial end 90 optically coupled to the viewport 40 and configured to receive an image from the viewport 40. The optical connection 38 also includes a second axial end 92 in optical communication with the detector array 42. As discussed in detail below, the optical connection 38 includes a substrate having multiple hollow passages each extending from the first axial end 90 to the second axial end 92, and each hollow passage includes a reflective coating disposed on an inner surface of the hollow passage to facilitate transmission of a respective portion of the image from the first axial end to the second axial end.

In the illustrated embodiment, a first area 94 of the first axial end 90 of the optical connection 38 is less than a second area 96 of the second axial end 92 of the optical connection 38. The smaller first area 94 of the first axial end 90 may facilitate coupling of the first axial end 90 to the viewport 40, and the larger second area 96 of the second axial end 92 may facilitate coupling of the second axial end 92 to the detector array 42. For example, the second area 96 may be particularly selected to facilitate alignment of the hollow passages with detection elements of the detector array 42, thereby enabling the detection elements to monitor the image. While the first area 94 of the first axial end 90 is less than the second area 96 of the second axial end 92 in the illustrated embodiment, it should be appreciated that, in alternative embodiments, the first area 94 of the first axial end 90 may be greater than or equal to the second area 96 of the second axial end 92.

In the illustrated embodiment, the viewport 40 includes an opening 98 disposed within the combustor casing 80. As illustrated, the opening 98 extends from an interior side 100 of the casing 80 to an exterior side 102 of the casing 80. In the illustrated embodiment, a window 103 is disposed within the opening 98. The window 103 is formed from a heat resistant transparent material, such as fused quartz or synthetic sapphire, among others. As will be appreciated, the window material may be particularly selected to be substantially transparent to the monitored wavelengths (e.g., short-wave infrared, mid-wave infrared, etc.). In alternative embodiments, the window 103 may be omitted, and an optical tube, which is optically coupled to the optical connection 38, may be inserted into the opening 98. The optical tube may include one or more lenses configured to focus an image from inside the combustor onto the optical connection 38. While the illustrated opening is disposed within the combustor casing 80, it should be appreciated that the opening may be disposed within the turbine casing, or a casing of another element of the gas turbine system 10, in alternative embodiments.

As illustrated, the optical connection 38 is positioned within a region 104 outside the casing 80, i.e., outward from the exterior side 102 of the opening 98. Accordingly, the optical connection 38 is substantially insulated from the flames and the hot exhaust gas inside the combustor casing 80, thereby enabling the optical monitoring system 36 to monitor the combustor 16 while the gas turbine engine is in operation. In the illustrated embodiment, a lens assembly 106 is coupled to the optical connection 38 and configured to focus radiation emitted by a combustor component and/or by the flames/exhaust gas onto the optical connection 38. As will be appreciated, the lens assembly 106 may include a lens, or series of lenses, configured to establish a field of view covering at least a portion of the combustor component, or another desired surface of the combustor 16. By selecting an appropriate lens assembly 106, a desired field of view may be established, thereby enabling the optical monitoring system 36 to capture a two-dimensional image of the combustor component.

As previously discussed, the optical connection 38 is positioned outside the casing 80, and includes a substrate having multiple hollow passages each having a reflective coating disposed on an inner surface of the hollow passage. The hollow passages are configured to convey respective portions of an image from the viewport 40 to the detector array 42, which is also positioned outside the casing 80, as illustrated. For example, during operation of the gas turbine engine, the viewport 40 receives an image from inside the casing (e.g., an image of a combustor component, an image of a turbine component, etc.). The optical connection 38 conveys the image from the viewport 40 to the detector array 42, thereby enabling the detector array 42 to monitor a component inside the casing. Because the optical connection 38 enables the detector array 42 to be positioned remote from the combustor, a cooling assembly, which may be employed to reduce the temperature of detector arrays positioned proximate to the combustor, may be obviated. As a result, costs associated with monitoring a gas turbine engine may be substantially reduced.

Figure 5:
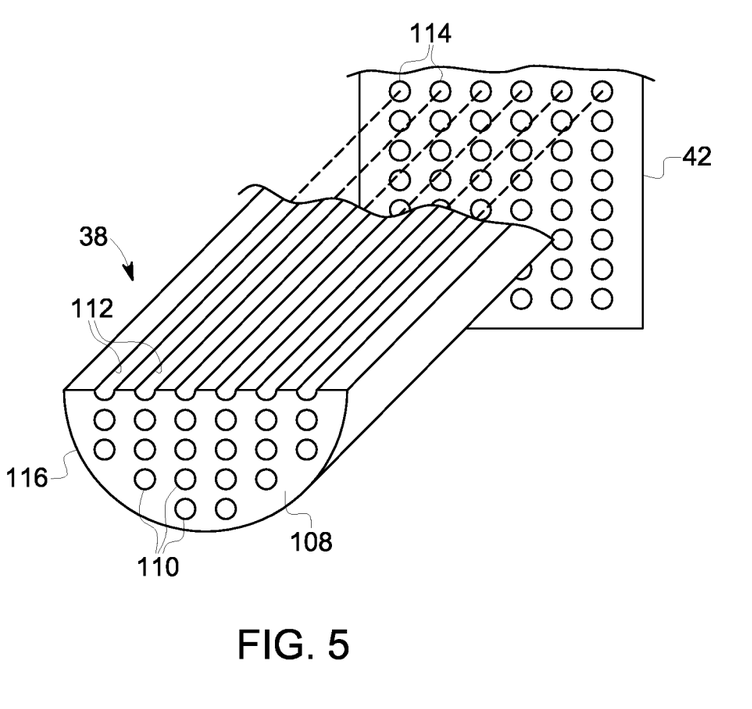
FIG. 5 is a partial cross-sectional perspective view of the optical connection of FIG. 4, taken along line 5-5.

FIG. 5 is a partial cross-sectional perspective view of the optical connection 38 of FIG. 4, taken along line 5-5. In the illustrated embodiment, the optical connection 38 includes a substrate 108 having multiple hollow passages 110 each extending from the first axial end of the optical connection to the second axial end of the optical connection. In certain embodiments, the hollow passages 110 are formed by an etching process, in which portions of the substrate are chemically removed to establish the hollow passages. A width (e.g., diameter) of each hollow passage 110 may be particularly selected to facilitate passage of electromagnetic radiation within a desired wavelength range. For example, the width of each hollow passage 110 may be larger than a maximum wavelength within the desired wavelength range. For example, if the detector array 42 is configured to monitor electromagnetic radiation within a wavelength range of about 2 microns to about 5 microns, the width of each hollow passage 110 may be larger than about 5 microns. In addition, the cross-sectional shape of each hollow passage 110 may be selected based on the shape of the substrate and/or the manufacturing techniques used to form the hollow passages. For example, in certain embodiments, each hollow passage 110 may have a substantially circular cross-section, as illustrated, a substantially elliptical cross-section, or a substantially polygonal cross-section, among other shapes.

As illustrated, each hollow passage 110 includes a reflective coating 112 disposed on an inner surface of the hollow passage to facilitate transmission of a respective portion of an image from the first axial end to the second axial end. In certain embodiments, the reflective coating 112 is applied to each hollow passage 110 by a chemical deposition process, such as vapor deposition. The reflective coating 112 may be particularly selected to reflect electromagnetic radiation within the desired wavelength range. For example, in certain embodiments, the reflective coating 112 may include multiple layers of dielectric material (e.g., cadmium sulfide, lead sulfide, etc.) to form a dielectric mirror configured to reflect short-wave infrared and/or mid-wave infrared radiation. In further embodiments, the reflective coating 112 may include one or more metallic layers formed from silver, silver iodide, gold, or aluminum, among other metals. The reflective coating 112 may also include a combination of metallic and dielectric layers.

In the illustrated embodiment, the detector array 42 includes multiple detection elements 114. Each detection element 114 is substantially aligned with a respective hollow passage 110 of the optical connection 38, and each detection element 114 is configured to receive a respective portion of the image from the respective hollow passage 110. In the illustrated embodiment, the hollow passages 110 are substantially aligned with one another to establish a coherent hollow passage array. The coherent hollow passage array establishes a substantially accurate mapping of a first image received by the first axial end of the optical connection to a second image projected by the second axial end of the optical connection. Accordingly, the detector array 42 may receive a substantially accurate intensity map of radiant energy within a desired wavelength range.

In certain embodiments, the substrate 108 may include more than about 5,000, about 100,000, about 500,000, about 1,000,000, about 2,000,000, about 5,000,000, or more hollow passages 110. By way of example, the substrate 108 may include about 5,000 to about 5,000,000 hollow passages, about 10,000 to about 1,000,000 hollow passages, or about 50,000 to about 200,000 hollow passages. In certain embodiments, the number of hollow passages 110 may be selected to substantially correspond to the number of detection elements 114 within the detector array 42. For example, each hollow passage 110 may facilitate transmission of a respective portion of an image from the viewport 40 to a corresponding detection element 114 of the detector array 42. Accordingly, increasing the number of hollow passages 110 within the substrate 108 may establish a corresponding increase in the resolution of the detected intensity map. In further embodiments, multiple hollow passages may be aligned with each detection element. In such embodiments, the number of hollow passages may be selected to substantially correspond to the number of detection elements multiplied by the desired number of hollow passages per detection element. For example, in certain embodiments, 1, 2, 4, 6, 8, 10, or more hollow passages may convey respective portions of an image to each detection element of the detector array. In further embodiments, each hollow passage may convey a respective portion of an image to multiple detection elements of the detector array. For example, in certain embodiments, each hollow passage may convey the respective portion of the image to 1, 2, 4, 6, 8, 10, or more detection elements.

In certain embodiments, the substrate 108 may be formed from a substantially flexible material, such as a substantially flexible polymeric material (e.g., a thermoplastic elastomer). In further embodiments, the substrate 108 may be formed from a substantially rigid material, such as glass (e.g., doped silica) or a substantially rigid polymeric material (e.g., polycarbonate). In such embodiments, the bending stiffness and/or the flexural rigidity of the optical connection 38 may be significantly higher than a flexible optical cable. (e.g., formed from multiple independent optical fibers). As will be appreciated, bending stiffness and/or flexural rigidity of an object may be at least partially dependent on an area moment of inertia of the object and an elastic modulus, such as Young's modulus, of the material that forms the object. As will be appreciated, objects having a larger area moment of inertia are more resistant to bending than objects having a smaller area moment of inertia. In certain embodiments, the rigid substrate may have an area moment of inertia 2, 5, 10, 20, 100, or more times greater than the area moment of inertia of a flexible optical cable. Accordingly, the bending stiffness and/or the flexural rigidity of the rigid substrate may be 1, 5, 10, 20, 100, or more times greater than the bending stiffness and/or the flexural rigidity of a flexible optical cable. As a result, in contrast to flexible optical cables, the optical connection may substantially maintain a desired shape during operation of the gas turbine engine. Furthermore, in certain embodiments, the optical connection 38 may include a protective sheath 116 disposed about the substrate 108 to shield the substrate and hollow passages from external contamination.

Figure 6:
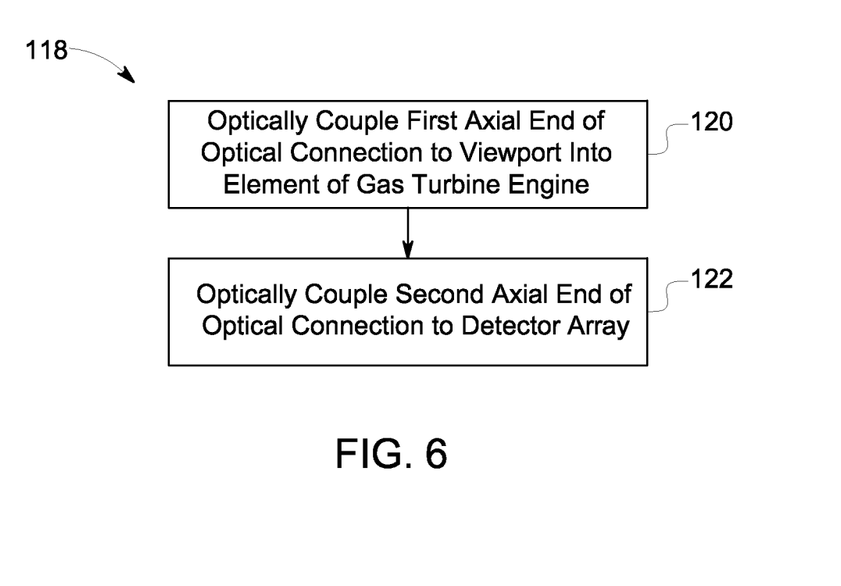
FIG. 6 is a flow diagram of an embodiment of a method of manufacturing an optical monitoring system for a gas turbine engine.

FIG. 6 is a flow diagram of an embodiment of a method 118 of manufacturing an optical monitoring system for a gas turbine engine. First, as represented by block 120, a first axial end of an optical connection is optically coupled to a viewport into an element (e.g., combustor, turbine, etc.) of the gas turbine engine. As previously discussed, the viewport is configured to receive an image from an interior of the element, and the optical connection is configured to receive the image from the viewport. In addition, the optical connection includes a substrate having multiple hollow passages each extending from the first axial end to a second axial end of the optical connection. Each hollow passage includes a reflective coating disposed on an inner surface of the hollow passage to facilitate transmission of a respective portion of the image from the first axial end to the second axial end.

As represented by block 122, the second axial end of the optical connection is optically coupled to a detector array having multiple detection elements. As previously discussed, the detection elements are configured to receive multiple respective portions of the image from the hollow passages, and the detector array is configured to output signals indicative of a two-dimensional intensity map of the image. Because electromagnetic radiation associated with each portion of the image passes through a respective hollow passage, losses due to absorption through the optical connection may be substantially reduced. Accordingly, the detector array may receive sufficient radiant energy to detect the two-dimensional intensity map, thereby facilitating generation of a two-dimensional temperature map of a monitored surface within the gas turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for optically monitoring a gas turbine engine, comprising:
   a viewport into an element of the gas turbine engine, wherein the viewport includes an opening disposed within a casing associated with the element and extending from an interior side of the casing to an exterior side of the casing and is configured to receive an image from an interior of the element;
   an optical connection having a first axial end and a second axial end, wherein the first axial end is optically coupled to the viewport and configured to receive the image from the viewport, the optical connection comprises a substrate having a plurality of hollow passages each extending from the first axial end to the second axial end, and each hollow passage includes a reflective coating disposed on an inner surface of the hollow passage to facilitate transmission of a respective portion of the image from the first axial end to the second axial end; and
   a detector array in optical communication with the second axial end of the optical connection, wherein the detector array comprises a plurality of detection elements, the plurality of detection elements is configured to receive a plurality of respective portions of the image from the plurality of hollow passages, and the detector array is configured to output signals indicative of a two-dimensional intensity map of the image,
   wherein the optical connection extends between the viewport and the detector array, optically couples the viewport to the detector array and conveys the image from the viewport to the detector array, and
   further wherein each hollow passage extends along a length of the optical connection and further facilitates transmission of the respective portion of the image from the viewport to the detector array.

2. The system of claim 1, wherein each detection element is substantially aligned with at least one respective hollow passage of the plurality of hollow passages, and each detection element is configured to receive at least one respective portion of the image from the at least one respective hollow passage.

3. The system of claim 1, wherein the substrate is formed from a substantially rigid material.

4. The system of claim 1, wherein the reflective coating comprises multiple layers of dielectric material to form a dielectric mirror configured to reflect electromagnetic radiation within a desired wavelength range.

5. The system of claim 1, wherein hollow passages of the plurality of hollow passages are substantially aligned with one another to establish a coherent hollow passage array.

6. The system of claim 1, wherein a first area of the first axial end of the optical connection is less than a second area of the second axial end of the optical connection.

7. The system of claim 1, wherein the element of the gas turbine engine comprises a combustor or a turbine.

8. The system of claim 1, wherein the system is configured to monitor the gas turbine engine while the gas turbine engine is in operation.

9. The system of claim 1, comprising an infrared camera having the detector array, wherein the detector array is configured to detect short-wave infrared images, mid-wave infrared images, or a combination thereof.

10. A system for optically monitoring a gas turbine engine, comprising:
   a viewport having an opening disposed within a casing of the gas turbine engine, wherein the opening extends from an interior side of the casing to an exterior side of the casing, and the viewport is configured to receive an image from inside the casing while the gas turbine engine is in operation;
   an optical connection positioned outside the casing and having a first axial end and a second axial end, wherein the first axial end is optically coupled to the viewport and configured to receive the image from the viewport, the optical connection comprises a substrate having a plurality of hollow passages each extending from the first axial end to the second axial end, and each hollow passage includes a reflective coating disposed on an inner surface of the hollow passage to facilitate transmission of a respective portion of the image from the first axial end to the second axial end; and
   a detector array in optical communication with the second axial end of the optical connection, wherein the detector array comprises a plurality of detection elements, the plurality of detection elements is configured to receive a plurality of respective portions of the image from the plurality of hollow passages, and the detector array is configured to output signals indicative of a two-dimensional intensity map of the image,
   wherein the optical connection extends between the viewport and the detector array, optically couples the viewport to the detector array and conveys the image from the viewport to the detector array, and
   further wherein each hollow passage extends along a length of the optical connection and further facilitates transmission of the respective portion of the image from the viewport to the detector array.

11. The system of claim 10, comprising a controller communicatively coupled to the detector array, wherein the controller is configured to generate a two-dimensional temperature map of a surface inside the casing based on the signals.

12. The system of claim 10, comprising an infrared camera having the detector array, wherein the detector array is configured to detect short-wave infrared images, mid-wave infrared images, or a combination thereof.

13. The system of claim 10, wherein each detection element is substantially aligned with at least one respective hollow passage of the plurality of hollow passages, and each detection element is configured to receive at least one respective portion of the image from the at least one respective hollow passage.

14. The system of claim 10, wherein the reflective coating comprises multiple layers of dielectric material to form a dielectric mirror configured to reflect electromagnetic radiation within a desired wavelength range.

15. The system of claim 10, wherein the casing comprises a combustor casing or a turbine casing.

16. A method of manufacturing an optical monitoring system for a gas turbine engine, comprising:
   optically coupling a first axial end of an optical connection to a viewport into an element of the gas turbine engine, wherein the viewport includes an opening disposed within a casing associated with the element and extending from an interior side of the casing to an exterior side of the casing and is configured to receive an image from an interior of the element, the optical connection is configured to receive the image from the viewport, the optical connection comprises a substrate having a plurality of hollow passages each extending from the first axial end to a second axial end of the optical connection, and each hollow passage includes a reflective coating disposed on an inner surface of the hollow passage to facilitate transmission of a respective portion of the image from the first axial end to the second axial end; and
   optically coupling the second axial end of the optical connection to a detector array having a plurality of detection elements, wherein the plurality of detection elements is configured to receive a plurality of respective portions of the image from the plurality of hollow passages, and the detector array is configured to output signals indicative of a two-dimensional intensity map of the image,
   wherein the optical connection extends between the viewport and the detector array, optically couples the viewport to the detector array and conveys the image from the viewport to the detector array, and
   further wherein each hollow passage extends along a length of the optical connection and further facilitates transmission of the respective portion of the image from the viewport to the detector array.

17. The method of claim 16, wherein hollow passages of the plurality of hollow passages are substantially aligned with one another to establish a coherent hollow passage array.

18. The method of claim 16, wherein the substrate is formed from a substantially rigid material.

19. The method of claim 16, wherein optically coupling the second axial end of the optical connection to the detector array comprises substantially aligning each detection element with at least one respective hollow passage of the plurality of hollow passages such that each detection element receives at least one respective portion of the image from the at least one respective hollow passage.

20. The method of claim 16, wherein the optical monitoring system is configured to monitor the gas turbine engine while the gas turbine engine is in operation.

* * * * *